July 28, 1936. J. A. KINNEY 2,049,265
SUCKER ROD COUPLING
Filed July 5, 1932
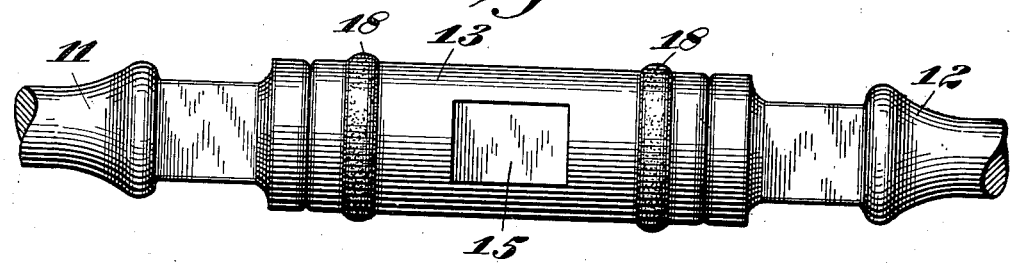
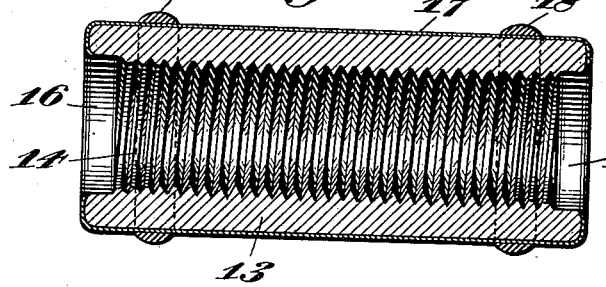 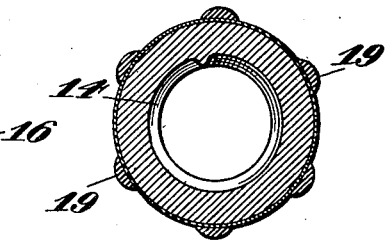
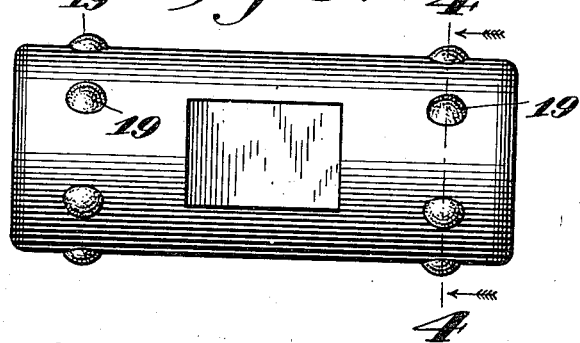 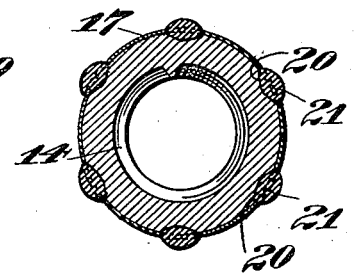
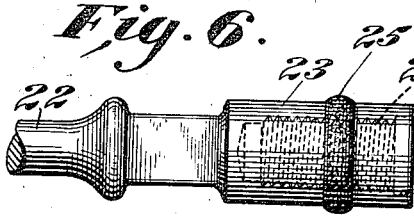
Inventor.
James A. Kinney.
By R. S. A. Dougherty
Attorney Patented July 28, 1936

2,049,265

UNITED STATES PATENT OFFICE 2,049,265

SUCKER ROD COUPLING

James A. Kinney, Lebanon, Pa., assignor to Bethlehem Steel Company, a corporation of Pennsylvania Application July 5, 1932, Serial No. 620,805

7 Claims. (Cl. 308—4)

My invention is directed to a sucker rod coupling provided with a projecting portion or portions of wear resisting material.

The primary object of these projecting portions is to take the wear which would otherwise be taken by the coupling proper.

Referring to the accompanying drawing:

Fig. 1 is a side view of two rods connected by means of a common type of coupling, but which is provided with one form of wear resisting projections in accordance with the principle of my invention;

Fig. 2 is a longitudinal section of the coupling shown in Fig. 1;

Fig. 3 is a side view of a like type of coupling but with the wear taking portions consisting of spaced beads of approximately hemispherical formation;

Fig. 4 is a cross section of the coupling of Fig. 3 taken on the line 4—4 of Fig. 3;

Fig. 5 is a cross section through a similar coupling to that of Fig. 4, showing similar projections but with the wear resisting material thereof disposed in depressions in the coupling proper instead of directly on the surface as in the preceding form;

Fig. 6 is a side view, on a somewhat reduced scale, of a coupling of the box type provided with a single projecting ring of wear resisting material.

In Fig. 1 are shown the ends of sucker rods 11 and 12 joined by means of coupling 13. This coupling, in its general formation, is of a common type, being internally screw threaded as indicated by reference numeral 14, having the wrench engaging portions 15 and provided with the interior shoulder portion 16 to be engaged by the ends of the sucker rods.

Preferably the coupling has a protecting coating 17 which may be of the nature of a plating of chromium or other suitable metal.

Upon its exterior this coupling bears two spaced rings 18 of a hard, wear resisting metal. As is evident from the drawing, these rings are disposed circumferentially of the coupling and constitute portions of the coupling elevated above the general surface thereof. In this particular example, these rings are of curved cross section in a plane taken longitudinally of the coupling, as indicated in Fig. 2, and are approximately semi-circular. These rings need to project but a moderate degree above the surface proper of the coupling.

These wear resisting rings are of hard, wear resisting metal. I have found that stellite is eminently suitable because of its great hardness, wear resistance, and especially because of its very low coefficient of friction.

The stellite may easily be applied to the coupling to form the elevated rings. The coupling is rotated on its longitudinal axis and heat is applied during such rotation to the portions of the coupling upon which the rings of stellite are to be deposited. This may be effectively done by means of burning gas jets. After the coupling has been heated to an elevated temperature, the ends of stellite rods or pencils are brought into engagement with the heated surfaces and, while the coupling is still rotating and with the heat still being applied from the gas jets, rings or beadings of stellite are deposited on the coupling.

These rings substantially increase the life of the coupling. As they are elevated above the surface of the coupling proper they take the wear which would otherwise be taken by the coupling, thereby saving the coupling from abrasion. Being extremely hard and having a low coefficient of friction the rings themselves suffer but little from abrasion.

An important advantage is that the well tubing, in which the sucker rod line reciprocates, is subjected to much less wear because of the greatly reduced friction thereon. This is due not only to the considerably lessened surface of the line which comes into engagement with the tubing but possibly even more to the low coefficient of friction of the stellite rings. Furthermore, stellite rings have a glazing effect upon the tube surface which also results in lessened wear. This last effect contrasts rather markedly with the usual cutting action of the couplings.

Another important advantage is the considerably lessened stress on the sucker rods due to the lessened friction between the line and the tubing.

An important aspect of my invention is that of permitting the use of corrosion resisting coatings on the couplings. As is well known, these couplings are frequently subjected to severe corrosive influences which greatly shorten their life. The ill effects of corrosion are greatly accentuated by the abrasion to which the couplings are ordinarily subjected. By the use of the elevated rings this augmenting of corrosion by abrasion is avoided and hence the effects of corrosion are considerably lessened when the coupling does not have a corrosion resisting coating. But my invention is particularly applicable when a corrosion resisting coating is employed.

A chromium plated coupling, for example, not provided with the elevated wear resisting portions of my invention, will effectively resist corrosion but a short time. When the coupling is first used the chromium coating is effective to protect against corrosion but after a relatively short time the abrasion of the surface of the coupling is sufficient to destroy or partly destroy the protective surface and the usual destructive corrosion sets in. By the use of the elevated wear resisting portions of my invention, the corrosion resisting coating of the coupling is not subjected to abrasion and the coating is thus permitted to serve its protective function.

In Figs. 3 and 4, I show a different embodiment of the projecting or elevated, wear taking bodies. Instead of being disposed in continuous rings, as in the embodiment of Figs. 1 and 2, the stellite or other wear resisting material occurs as rings of spaced beads 19, disposed in two planes, circumferentially about the coupling. As shown these beads are of substantially hemispherical form. As will be evident, this embodiment of the invention will offer even less frictional engagement with the tubing than that of the embodiment first described.

In this form of the invention the beads are disposed directly upon the surface of the coupling. In the embodiment shown in Fig. 5, however, the surface of the coupling is first provided with depressions 20 in which the stellite is deposited to form beads 21. These beads, as those of the form just described, project somewhat above the general surface of the coupling.

While the forms of the invention already described are shown as applied to a type of coupling which is embodied separate from the sucker rods but adapted to have threaded connection therewith, it is obvious that my invention is not limited to couplings of that type. In Fig. 6 I show my invention applied to the type in which the coupling body is integral with an end of the sucker rod. In this form the sucker rod 22 is provided at one of its ends with the box 23 internally screw threaded at 24 and adapted to receive the pin end of the sucker rod to which it is to be attached. In Fig. 6 I have shown a wear resisting ring 25 disposed on the box portion 23.

Thus it will be evident that when I refer to a coupling the term is not used in a restrictive sense.

Obviously the embodiments shown and described are capable of considerable modification and I do not intend to limit the protection sought by the particular form or disposition of the elevated, wear resisting bodies.

Having described my invention what I claim as new and desire to secure by Letters Patent is:

1. A coupling for sucker rods, comprising a main body portion and spaced elevated bearing portions of hard wear resisting material upon the exterior of the main body portion and integral therewith.

2. A coupling for sucker rods, comprising a main body portion and elevated bearing portions of stellite upon the exterior of the main body portion and integral therewith.

3. A coupling for sucker rods, comprising a main body portion of generally cylindrical form and elevated rings of hard wear resisting metal disposed circumferentially upon the exterior of the main body portion and integral therewith.

4. A coupling for sucker rods, comprising a main body portion and having an elevated ring of hard wear resisting metal of a low coefficient of friction disposed circumferentially upon the exterior of the main body portion and integral therewith.

5. A coupling for sucker rods, comprising a main body portion and spaced, elevated bodies thereon of hard, wear resisting metal of a low coefficient of friction and integral therewith.

6. A coupling for sucker rods, comprising a main body portion and having disposed on its outer surface spaced elevated beads of a hard, wear resisting metal of a low coefficient of friction and integral therewith.

7. A coupling for sucker rods, comprising a main body portion, a corrosion resisting protective coating on the outer surface thereof, and elevated bearing portions of a hard, wear resisting metal of a low coefficient of friction disposed in spaced relation upon the surface thereof and integral therewith.

JAMES A. KINNEY.